United States Patent
Ishikawa et al.

(10) Patent No.: US 10,732,365 B2
(45) Date of Patent: Aug. 4, 2020

(54) CORE ADJUSTMENT METHOD

(71) Applicant: Panasonic Intellectual Property Management Co., Ltd., Osaka (JP)

(72) Inventors: Ryo Ishikawa, Osaka (JP); Makoto Ryudo, Hyogo (JP); Doukei Nagayasu, Hyogo (JP); Hitoshi Nishimura, Osaka (JP); Jingbo Wang, Hyogo (JP); Masatoshi Nishio, Osaka (JP); Hideaki Yamaguchi, Osaka (JP); Yoshiaki Takenaka, Osaka (JP); Kiyotaka Eizumi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/461,637

(22) PCT Filed: Nov. 27, 2017

(86) PCT No.: PCT/JP2017/042313
§ 371 (c)(1),
(2) Date: May 16, 2019

(87) PCT Pub. No.: WO2018/101184
PCT Pub. Date: Jun. 7, 2018

(65) Prior Publication Data
US 2019/0353857 A1    Nov. 21, 2019

(30) Foreign Application Priority Data
Nov. 29, 2016   (JP) ................. 2016-230817

(51) Int. Cl.
*G02B 6/42* (2006.01)
*G02B 6/02* (2006.01)
(Continued)

(52) U.S. Cl.
CPC ............ *G02B 6/4225* (2013.01); *B23K 26/00* (2013.01); *B23K 26/035* (2015.10);
(Continued)

(58) Field of Classification Search
CPC ................................... G02B 6/42; G02B 6/02
(Continued)

(56) References Cited

U.S. PATENT DOCUMENTS 4,830,486 A * 5/1989 Goodwin ............... G01S 7/497
356/4.09
5,430,748 A * 7/1995 MacCormack ..... H01S 3/10076
372/106
(Continued)

FOREIGN PATENT DOCUMENTS

JP    8-167754       6/1996
JP    2003-344718   12/2003
(Continued)

OTHER PUBLICATIONS

International Search Report of PCT application No. PCT/JP2017/042313 dated Jan. 16, 2018.

*Primary Examiner* — Kaveh C Kianni
(74) *Attorney, Agent, or Firm* — Wenderoth, Lind & Ponack, L.L.P.

(57) ABSTRACT

A condenser lens for collecting a laser beam (300) is disposed between the laser oscillator and the incident end surface of the optical fiber. The laser beam (300) is divided into a plurality of beams (303, 304). The power of the laser beam (304) is measured and maximized by adjusting the position of the condenser lens. The FFP of the laser beam (303) is measured and minimized by adjusting the position of the condenser lens. These adjusted positions are stored as the first and second lens positions. The FFP of the laser beam (303) is measured while the condenser lens is being moved (Continued)

between these positions so as to make the BPP not more than a predetermined value.

4 Claims, 9 Drawing Sheets

(51) Int. Cl.
    *B23K 26/035* (2014.01)
    *B23K 26/00* (2014.01)
    *B23K 26/06* (2014.01)
    *B23K 26/067* (2006.01)

(52) U.S. Cl.
    CPC ........ *B23K 26/067* (2013.01); *B23K 26/0626* (2013.01); *B23K 26/0648* (2013.01); *G02B 6/4204* (2013.01); *G02B 6/4227* (2013.01)

(58) Field of Classification Search
    USPC .................................................... 385/52, 25
    See application file for complete search history.

(56) References Cited

U.S. PATENT DOCUMENTS

| | | | | |
|---|---|---|---|---|
| 5,815,626 | A * | 9/1998 | Kuba | ............ A61B 18/22 385/124 |
| 6,563,995 | B2 * | 5/2003 | Keaton | ............ G02B 6/03611 385/123 |
| 6,603,909 | B2 * | 8/2003 | Varner | ............ G02B 6/02004 385/123 |
| 6,970,631 | B2 * | 11/2005 | Arbore | ............ H01S 3/06754 359/341.1 |
| 6,987,783 | B2 * | 1/2006 | Fajardo | ............ H01S 3/063 372/10 |
| 7,039,076 | B2 * | 5/2006 | Kane | ............ H01S 3/06754 372/25 |
| 2003/0234977 | A1 * | 12/2003 | Kane | ............ H01S 3/06758 359/341.3 |
| 2007/0195850 | A1 | 8/2007 | Schluter et al. | |
| 2008/0063017 | A1 | 3/2008 | Schnitzler et al. | |
| 2008/0240181 | A1 * | 10/2008 | Shibatani | ............ H01S 5/0683 372/29.014 |
| 2008/0253415 | A1 * | 10/2008 | Livingston | ......... G02B 27/0905 372/38.01 |
| 2008/0253417 | A1 * | 10/2008 | Livingston | ......... B23K 26/0613 372/38.02 |
| 2010/0166028 | A1 | 7/2010 | Shibatani et al. | |
| 2011/0228807 | A1 * | 9/2011 | Pedersen | ............ H01S 3/1083 372/98 |
| 2019/0146163 | A1 * | 5/2019 | Altshuler | ............ G02B 6/4206 385/136 |

FOREIGN PATENT DOCUMENTS

| | | | |
|---|---|---|---|
| JP | 2008-501144 | 1/2008 | |
| JP | 2008-251864 | 10/2008 | |
| WO | WO 02070987 A1 * | 9/2002 | ............ G02B 6/27 |

* cited by examiner

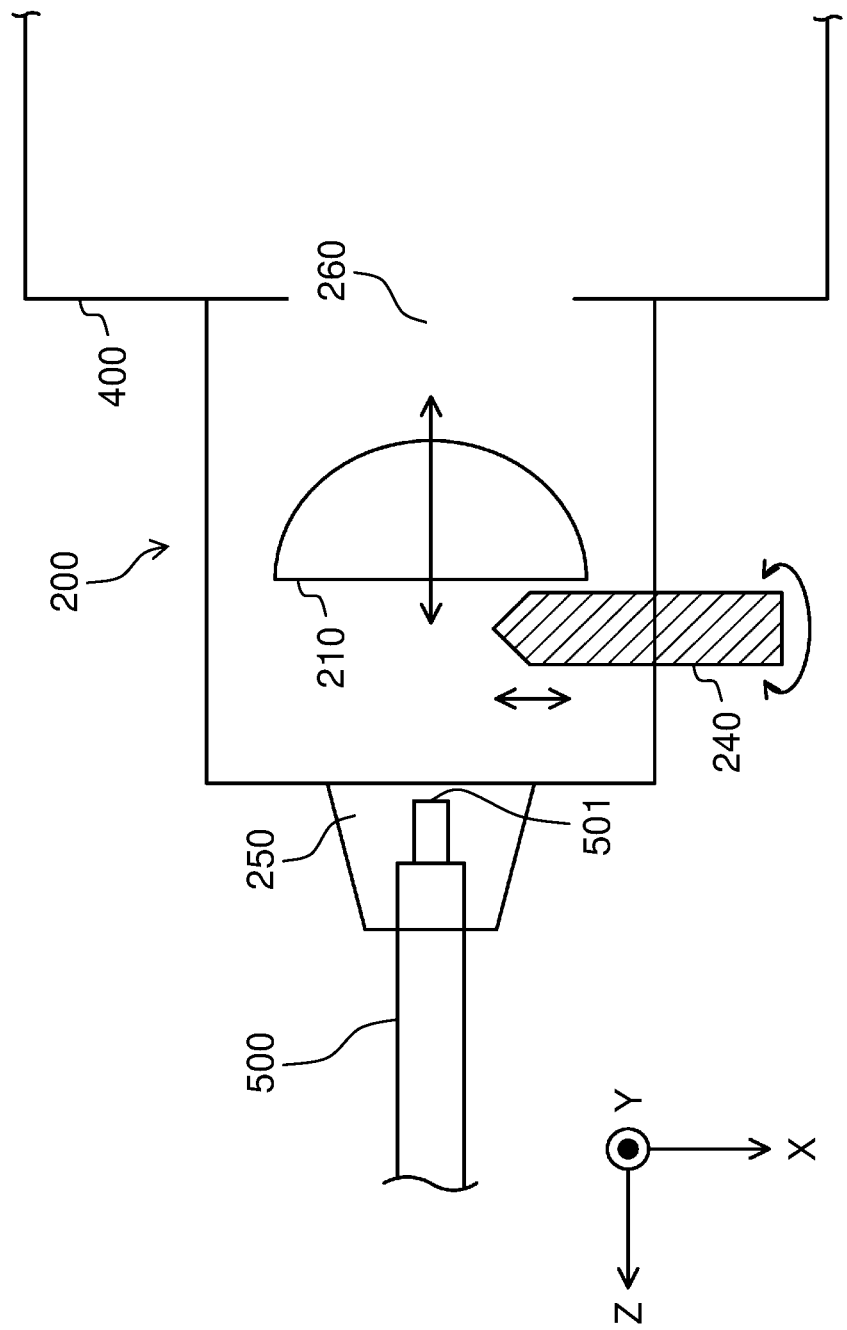

CORE ADJUSTMENT METHOD

CROSS-REFERENCE TO RELATED APPLICATIONS

This application is a U.S. national stage application of the PCT International Application No. PCT/JP2017/042313 filed on Nov. 27, 2017, which claims the benefit of foreign priority of Japanese patent application No. 2016-230817 filed on Nov. 29, 2016, the contents all of which are incorporated herein by reference.

TECHNICAL FIELD

The present invention relates to a method for alignment between the optical fiber and the laser oscillator in laser processing devices and other devices.

BACKGROUND ART

There are known laser processing devices for welding or processing workpieces by guiding the laser beam emitted from a laser oscillator such as a gas laser or a solid-state laser through an optical fiber.

It is common to perform alignment between the laser oscillator and the optical fiber in order to enhance their coupling efficiency, thereby ensuring the laser beam power used for processing.

A well-known alignment technique is performed as follows. A laser beam from the laser oscillator strikes one end of the optical fiber through an optical member such as a condenser lens, and the power of the laser beam emitted from the other end is measured with, for example, a power meter. The position of the condenser lens is adjusted to maximize the power (e.g., Patent Literature 1).

CITATION LIST

Patent Literature

PTL 1: Japanese Unexamined Patent Application Publication No. 8-167754

SUMMARY

There has been a growing demand for high processing precision in recent years, and therefore, for the control of the shape of the laser beam applied to workpieces.

However, the condenser lens position where the laser beam power is maximum does not necessarily coincide with the condenser lens position where the beam quality, typified by laser beam shape, is optimized. For this reason, when an alignment is completed with the condenser lens fixed at the former position, it is not always possible to obtain a desired beam quality. This may cause the alignment process to be repeated again, thus decreasing the work efficiency.

In view of these problems, an object of the present invention is to provide an alignment method performed while monitoring the power and quality of the laser beam at the same time.

To accomplish the object, according to an aspect of the present invention, the laser beam emitted from the laser oscillator through the optical fiber is divided such that the power and quality of the laser beam can be measured at the same time. The alignment between the laser oscillator and the optical fiber is performed based on these measurement results.

To be more specific, the aspect of the present invention is a method for alignment between a laser oscillator and an optical fiber to be connected to the laser oscillator as follows. The method includes a step of placing a condenser lens and a lens adjustment mechanism between a light emission part of the laser oscillator and an incident end of the optical fiber, the condenser lens being configured to collect a laser beam emitted from the laser oscillator and the lens adjustment mechanism being configured to adjust the position of the condenser lens. The method further includes a measurement step of dividing the laser beam emitted from the emission end of the optical fiber into a plurality of laser beams including at least a first laser beam and a second laser beam, and measuring the power of the first laser beam and the far field pattern (FFP) of the second laser beam. The method further includes a first adjustment step of adjusting the position of the condenser lens such that the measured power of the first laser beam is maximum, and storing the position of the condenser lens as a first lens position. The method further includes a second adjustment step of calculating a beam parameter product (BPP) of the second laser beam from the FFP of the second laser beam measured in the measurement step, adjusting the position of the condenser lens such that the BPP is minimum, and storing the position of the condenser lens as a second lens position. The method further includes a third adjustment step of measuring an FFP of the second laser beam when the condenser lens is moved between the first lens position and the second lens position. The method further includes a fourth adjustment step of calculating a BPP of the second laser beam from the FFP of the second laser beam measured in the third adjustment step, and adjusting the position of the condenser lens such that the BPP calculated from the FPP of the second laser beam measured in the third adjustment step is not more than a predetermined value.

According to this method for alignment between the laser oscillator and the optical fiber, the laser beam power can be maximized with at least a certain level of beam quality ensured while the power and quality of the beam are being monitored at the same time.

In the fourth adjustment step, when the BPP of the second laser beam is not less than the predetermined value, fixing, as a final position of the condenser lens, the position immediately before the position where the BPP has the predetermined value, and when the BPP is less than the predetermined value, fixing, as the final position of the condenser lens, the first lens position.

This method enables the laser beam to be narrowed and formed into to a desired shape while keeping the laser beam power at a level sufficient for processing.

The lens adjustment mechanism includes a displacement sensor configured to detect the position of the condenser lens, and an actuator configured to move the condenser lens. The first adjustment step preferably includes driving the actuator to move the position of the condenser lens detected by the displacement sensor to the first lens position. The second adjustment step preferably includes driving the actuator to move the position of the condenser lens detected by the displacement sensor to the second lens position. The fourth adjustment step preferably includes driving the actuator to move the position of the condenser lens detected by the displacement sensor to the position where the BPP is not more than the predetermined value.

This method eliminates the need for a manual operation to be performed near the laser oscillator during laser oscillation, thereby improving the safety of the alignment process.

According to the aspect of the present invention, the laser beam can be narrowed and formed into a desired shape and can also have a maximum power. The laser processing device subjected to such an alignment can perform excellent laser processing.

BRIEF DESCRIPTION OF DRAWINGS

FIG. 3A is a schematic diagram of the joint between the laser oscillator and the optical fiber when viewed from the direction orthogonal to the optical axis of the laser beam.

DESCRIPTION OF EMBODIMENTS

The embodiments of the present invention will be described in detail as follow with reference to drawings. The following exemplary embodiments are merely examples of the present invention and do not limit the application or use of the present invention.

First Exemplary Embodiment

The Structure of the Laser Processing Device

Figure 1:
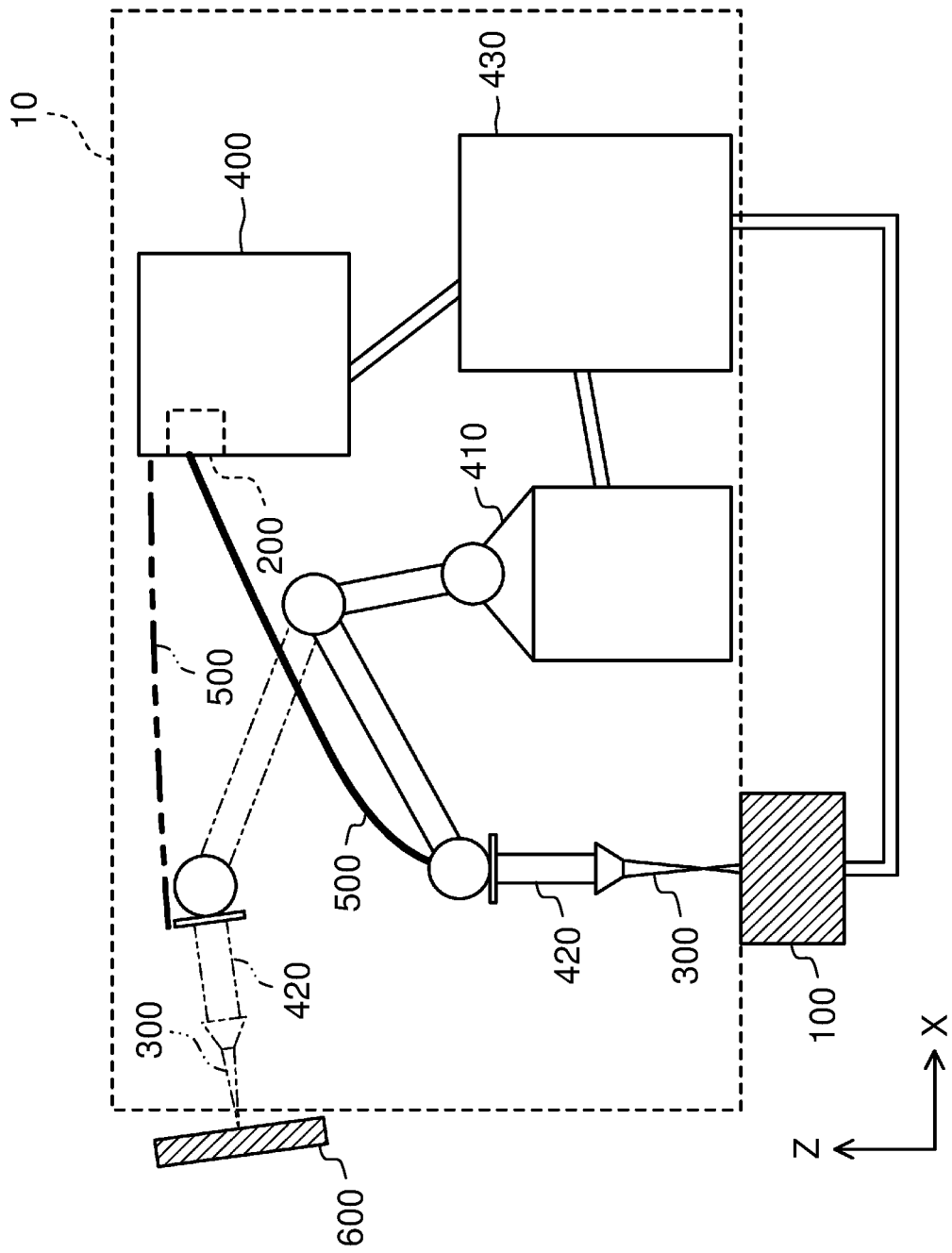
FIG. 1 shows the configuration of a laser processing device according to a first exemplary embodiment of the present invention.

FIG. 1 shows the configuration of laser processing device 10 according to a first exemplary embodiment of the present invention. Device 10 includes laser oscillator 400 for emitting a laser beam and optical fiber 500 for guiding the laser beam emitted from laser oscillator 400. Device 10 further includes laser emission head 420 and manipulator 410. Laser emission head 420, which is connected to the emission end (not shown) of optical fiber 500, applies laser beam 300 guided by optical fiber 500 to workpiece 600. Manipulator 410 operates laser emission head 420 to move it to workpiece 600.

Device 10 further includes controller 430 connected to laser oscillator 400 and manipulator 410. Controller 430 includes a plurality of arithmetic processors, a controller, a storage unit and a display unit (FIG. 4) so as to control the laser oscillation of laser oscillator 400 and the operation of manipulator 410.

When alignment between laser oscillator 400 and optical fiber 500 is performed for maintenance or other purposes, manipulator 410 moves laser emission head 420 to laser beam evaluation device 100, which is connected to controller 430. Laser beam evaluation device 100 evaluates the properties of laser beam 300.

Figure 4:
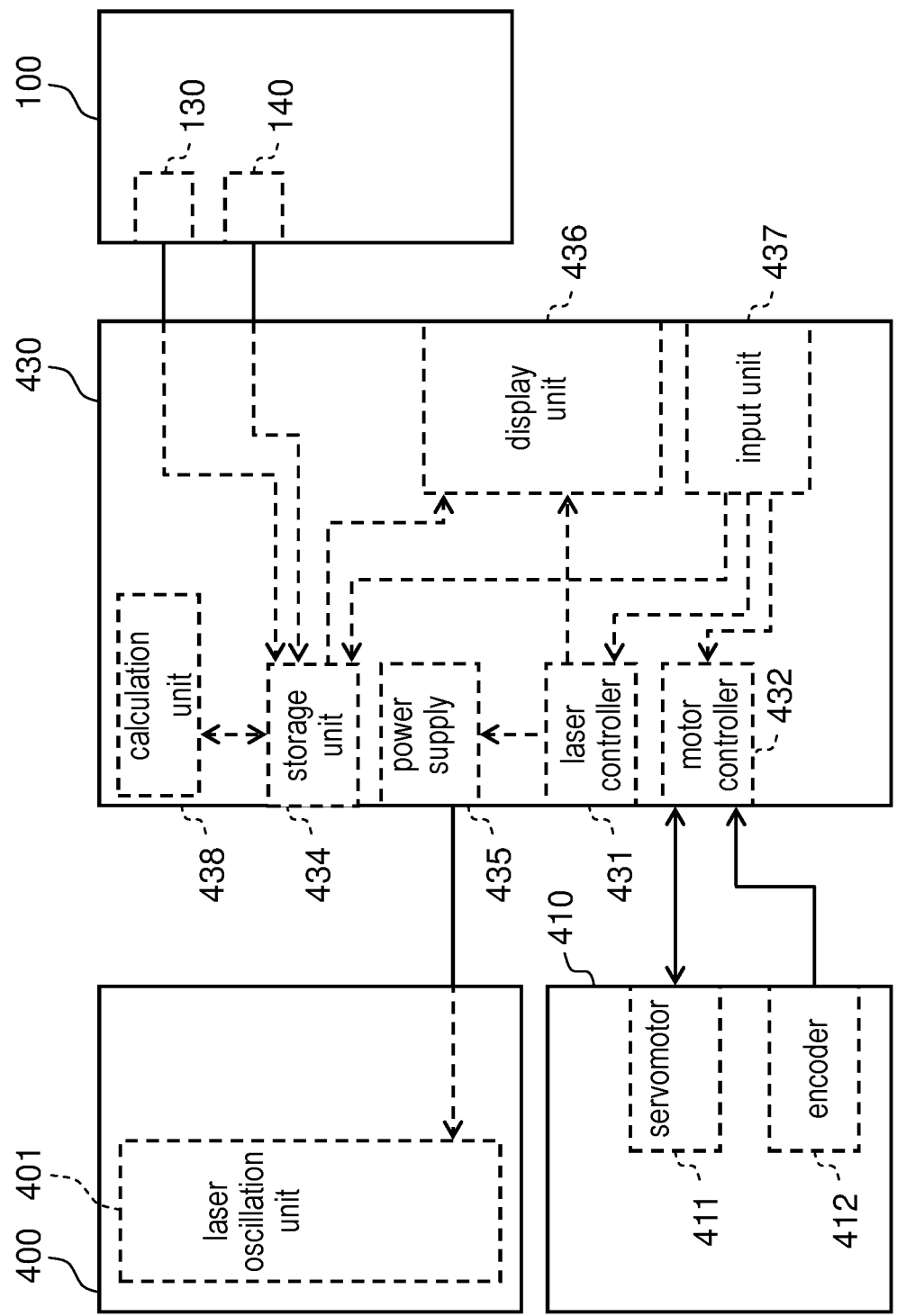
FIG. 4 is a functional block diagram of the laser processing device.

Controller 430 receives signals from device 100, stores them, processes them into desired forms, and display them on a display unit (FIG. 4).

Figure 2:
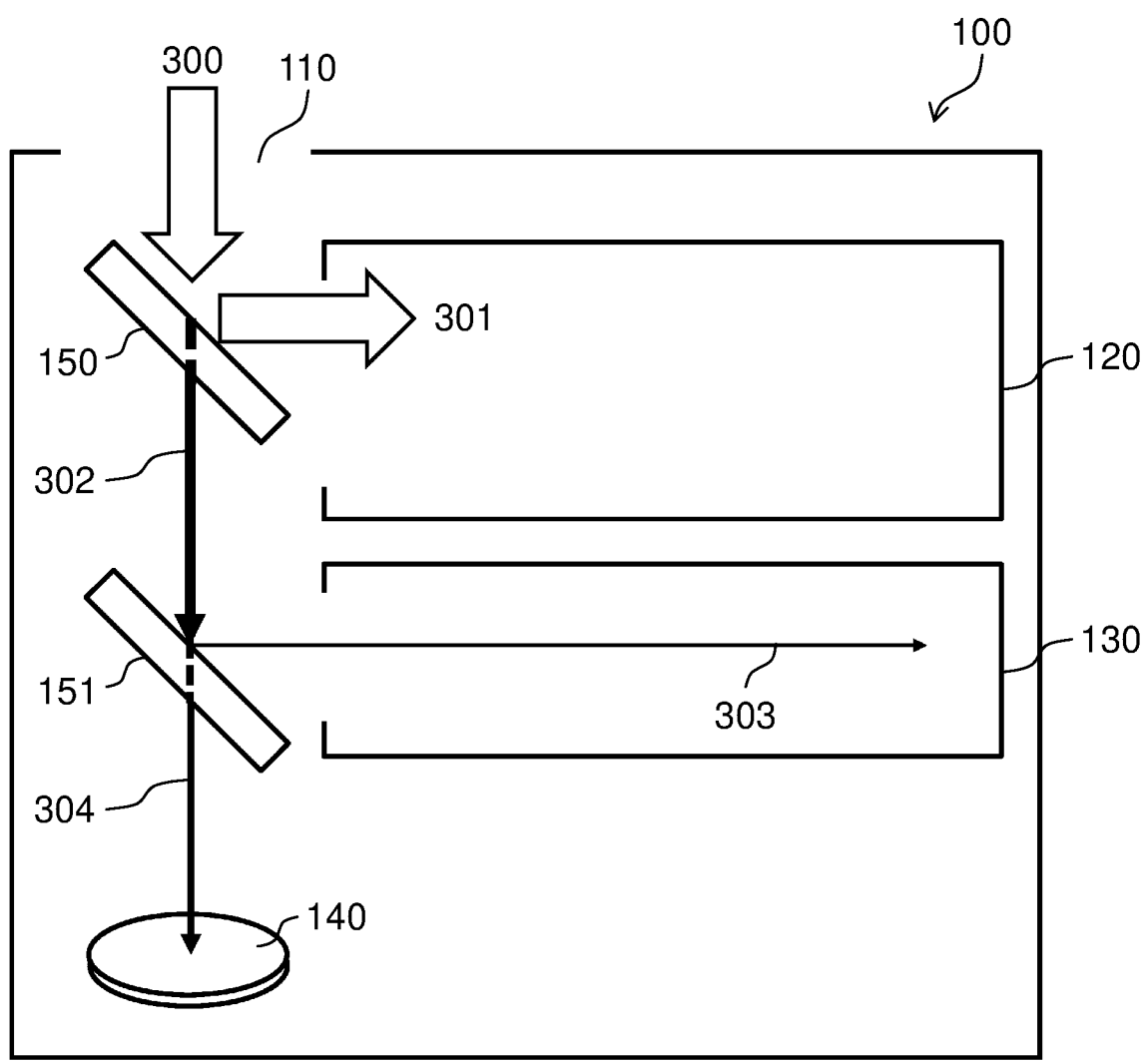
FIG. 2 is a schematic diagram of a laser beam evaluation device.

FIG. 2 is a schematic diagram of laser beam evaluation device 100. Device 100 includes incident unit 110 of laser beam 300, partial reflection mirror 150 and damper 120. Mirror 150 reflects part of the incident laser beam 300 and transmits the rest. Damper 120 absorbs laser beam 301 reflected by partial reflection mirror 150.

Laser beam evaluation device 100 further includes partial reflection mirror 151 and far field pattern (FFP) measurement unit 130. Mirror 151 reflects part of laser beam 302 that has passed through partial reflection mirror 150 and transmits the rest. FFP measurement unit 130 measures the intensity distribution of laser beam 303 reflected by partial reflection mirror 151. Laser beam evaluation device 100 further includes power measurement unit 140 for measuring the power of laser beam 304 that has passed through partial reflection mirror 151.

In laser beam evaluation device 100, the laser beam emitted from laser oscillator 400 passes through optical fiber 500, collected by laser emission head 420, and strikes incident unit 110.

Laser beam 300 incident on device 100 is divided by partial reflection mirrors 150 and 151, and the divided beams are supplied to power measurement unit 140, FFP measurement unit 130 and damper 120.

Power measurement unit 140 measures the power of the incident laser beam 304 (first laser beam), while FFP measurement unit 130 measures the FFP, which is the far-field image of laser beam 303 (second laser beam). This FFP corresponds to the laser beam shape and shows a spatial intensity distribution on the surface on which the laser beam is incident.

Partial reflection mirrors 150 and 151 have predetermined reflectances of laser beams 300 and 302, respectively. Mirrors 150 and 151 divide laser beams 300 and 302 such that the amount of laser beams required for measurement can be transmitted to power measurement unit 140 and FFP measurement unit 130.

For example, the reflectance and transmittance of mirror 150 are set so as to reflect 99.9% of the incident laser beam 300 to damper 120 and to transmit the remaining 0.1%. Similarly, the reflectance and transmittance of mirror 151 are set so as to reflect 0.1% of the incident laser beam 302 to FFP measurement unit 130 and to transmit the remaining 99.9%.

The placement of power measurement unit 140, FFP measurement unit 130 and damper 120 in laser beam evaluation device 100 is not limited to the one shown in FIG. 2. For example, unit 140 and damper 120 may be replaced by each other. In that case, the reflectance and transmittance of mirrors 150 and 151 can be changed appropriately.

Laser beam 301 is absorbed by damper 120 and consumed as heat.

Figure 3B:
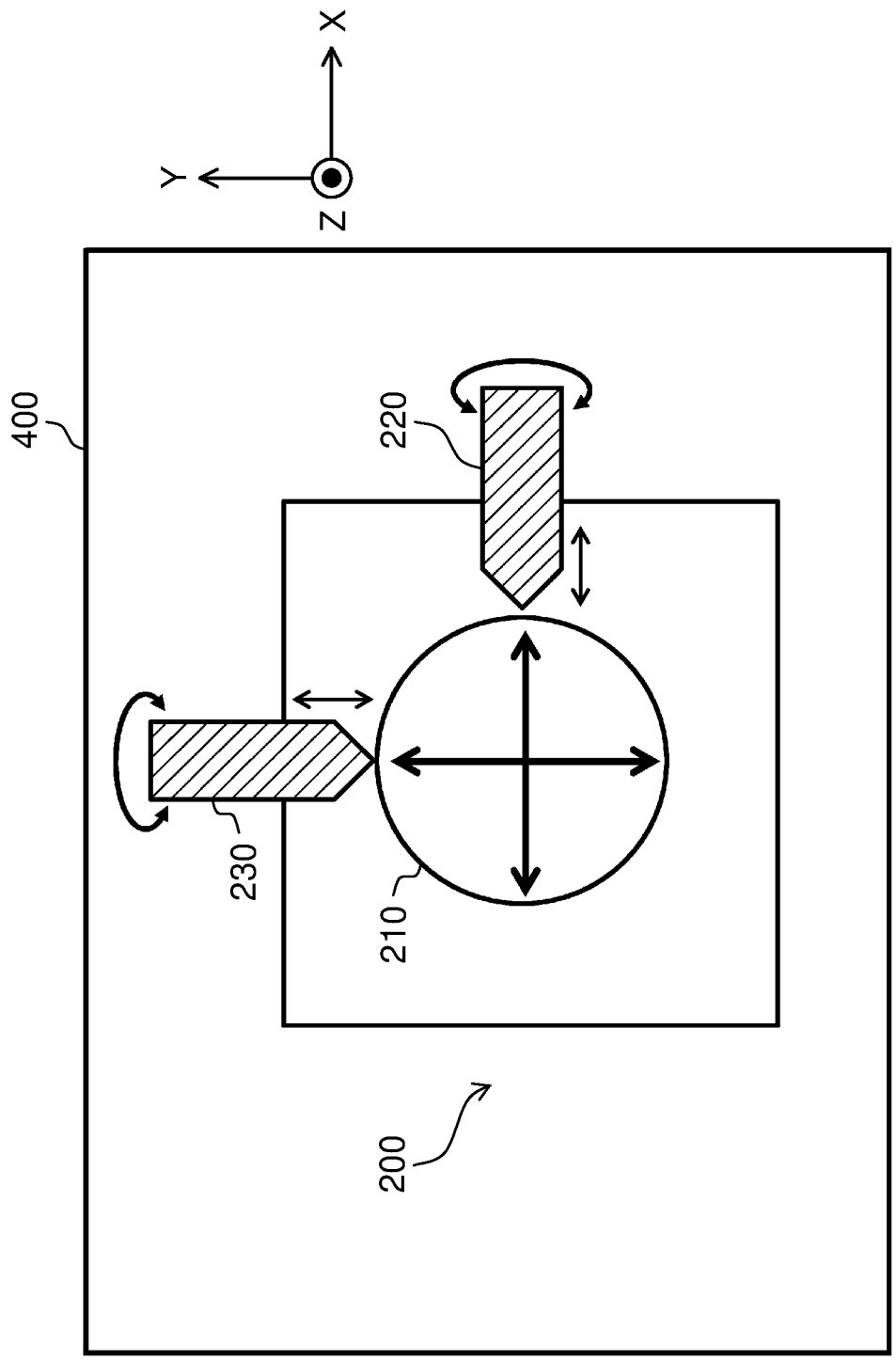
FIG. 3B is a schematic diagram of the joint between the laser oscillator and the optical fiber when viewed along the optical axis of the laser beam.

FIGS. 3A and 3B are schematic diagrams of the joint between laser oscillator 400 and optical fiber 500. Laser processing device 10 further includes fiber joint 200 disposed between laser oscillator 400 and optical fiber 500. Fiber joint 200 includes aperture 260, condenser lens 210 and lens adjustment mechanisms 220 to 240. Aperture 260 is located on the plane perpendicular to the optical axis of the laser beam. Condenser lens 210 is movable along each of the X, Y and Z axes. The optical axis is along the Z axis.

When the plane perpendicular to the optical axis is referred to as x-y plane, two axes perpendicular to each other in the x-y plane are referred to as the X axis and the Y axis. Lens adjustment mechanisms 220 to 240 adjust the position of condenser lens 210 along these axes. In the present embodiment, lens adjustment mechanisms 220 to 240 are operated manually. Fiber joint 200 further includes connector 250 for fixing the end of optical fiber 500 such that incident end surface 501 of optical fiber 500 can be perpendicular to the optical axis of the laser beam.

The Functional Block Diagram of the Laser Processing Device

FIG. 4 is a functional block diagram of the laser processing device according to the present embodiment. Laser oscillator 400 includes laser oscillation unit 401 and fiber joint 200 shown in FIGS. 3A and 3B.

Manipulator 410 includes servomotor 411 for rotating each joint of manipulator 410 and encoder 412 connected to servomotor 411.

For simplification, FIG. 4 includes only one servomotor 411 and only one encoder 412.

Controller 430 includes laser controller 431, motor controller 432, storage unit 434, power supply 435, display unit 436, input unit 437 and calculation unit 438.

Laser controller 431 transmits a control signal to power supply 435 according to the control program received from input unit 437 so as to control the output of laser oscillation unit 401.

Motor controller 432 controls the speed and amount of rotation of servomotor 411 of manipulator 410 according to the control program received from input unit 437 and to the feedback signal obtained from encoder 412.

Storage unit 434 stores the following information: the information about the laser beam power received from power measurement unit 140 of laser beam evaluation device 100, and the information about the laser beam intensity distribution received from FFP measurement unit 130 of laser beam evaluation device 100.

Power supply 435 supplies electric power to laser oscillation unit 401 according to the control signal received from laser controller 431 and the control signal received from the output monitor (not shown) of laser oscillator 400.

Display unit 436 displays the following: the output of laser oscillator 400, the power and FFP of the laser beam measured by laser beam evaluation device 100, and the beam parameter product (BPP) of the laser beam calculated by calculation unit 438.

Input unit 437 receives the control program and numerical values that determine the output of laser oscillator 400 and the speed and amount of travel of manipulator 410.

Calculation unit 438 performs arithmetic processing using the information received from input unit 437 and stored in storage unit 434. The arithmetic processing is used for the control performed by laser controller 431 and motor controller 432. For example, calculation unit 438 fetches the information about the laser beam intensity distribution from storage unit 434 and calculates the BPP of the laser beam. Furthermore, calculation unit 438 can process various kinds of information into charts and graphs in appropriate forms and can make them displayed on display unit 436.

FIG. 4 only illustrates the functional blocks used for the alignment, and the other functions are not illustrated. For example, a safe stop function block and the storage of the control program are not shown.

Whether signals and commands are supplied to laser controller 431, motor controller 432 and calculation unit 438 either directly from input unit 437 or after being stored in storage unit 434 is determined appropriately by the specification of laser processing device 10 or controller 430, and is not limited to the procedure described in the present embodiment. Similarly, the signal flow in controller 430 is not limited to that described in the present embodiment, either.

Details of the Alignment Process

Figure 5:
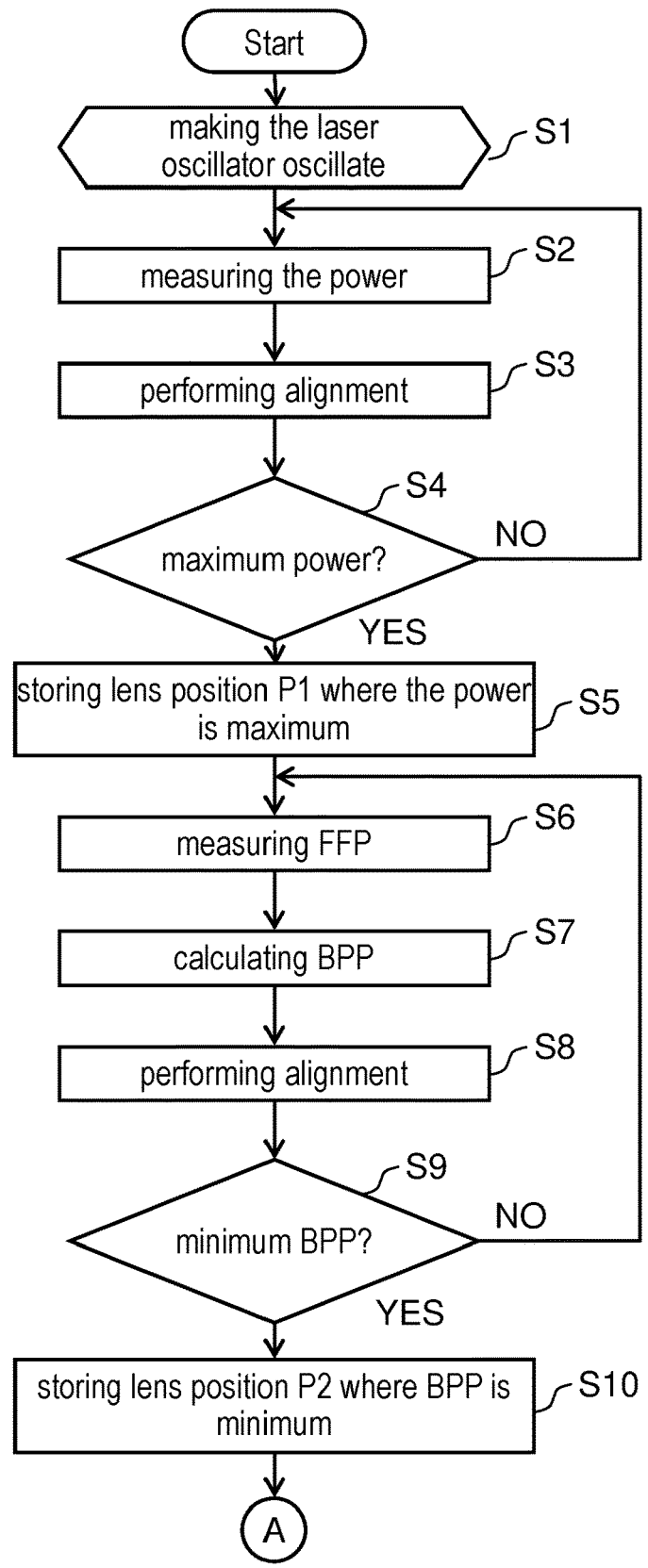
FIG. 5 is a flowchart of a process of alignment between the laser oscillator and the optical fiber according to the first exemplary embodiment.
Figure 6:
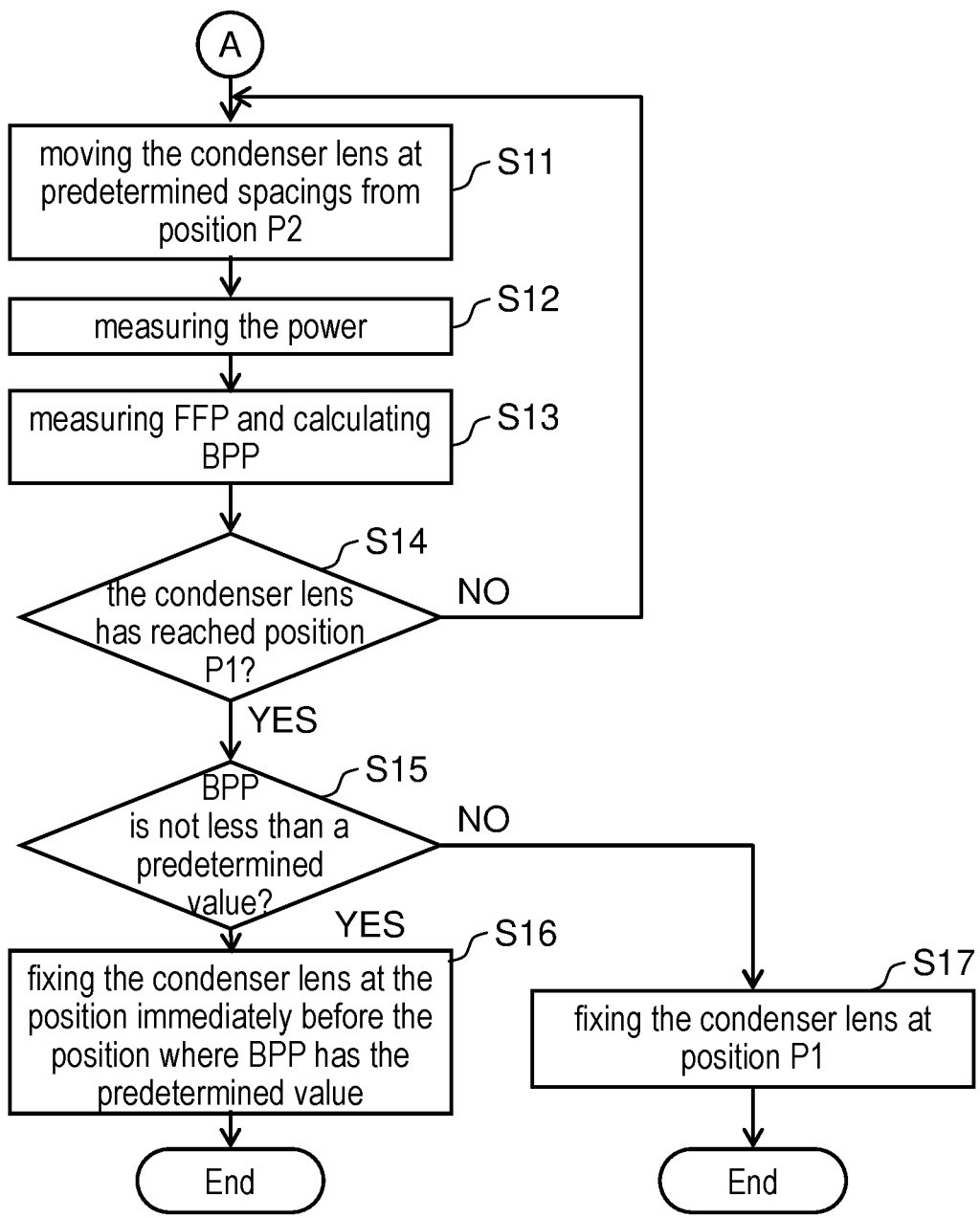
FIG. 6 is a flowchart of a process of alignment subsequent to the flowchart of FIG. 5.

FIGS. 5 and 6 show flowcharts of processes of alignment between laser oscillator 400 and optical fiber 500 according to the present embodiment.

First, lens adjustment mechanisms 220 to 240 move condenser lens 210 to the designed center position with respect to the X, Y and Z axes, so that laser emission head 420 and laser beam evaluation device 100 can be set in position. Controller 430 makes laser oscillator 400 oscillate at an output power close to actual use conditions (Step S1).

Next, the laser beam power, which has been evaluated by power measurement unit 140 of laser beam evaluation device 100, is monitored (Step S2).

Lens adjustment mechanisms 220 to 240 of fiber joint 200 move condenser lens 210 based on the monitoring results so as to perform alignment (Step S3).

Whether the laser beam power is maximized or not is monitored and determined by moving condenser lens 210 (Step S4). When a lens position P1 where the power is maximum is found, the lens position P1 is either recorded on recording paper or stored in storage unit 434 (FIG. 4) of controller 430 (Step S5).

The details of Step S3 above will be described with reference to FIGS. 7A and 7B.

As shown in FIGS. 3A and 3B, when lens adjustment mechanisms 220 to 240 are turned clockwise when viewed along their axes, condenser lens 210 moves in the positive direction of these axes. When mechanisms 220 to 240 are turned counterclockwise, condenser lens 210 moves in the negative direction of these axes.

Referring to the laser beam power displayed on display unit 436 of controller 430, for example, lens adjustment mechanism 220 moves condenser lens 210 on the designed center position along the negative direction of the X axis.

Figure 7A:
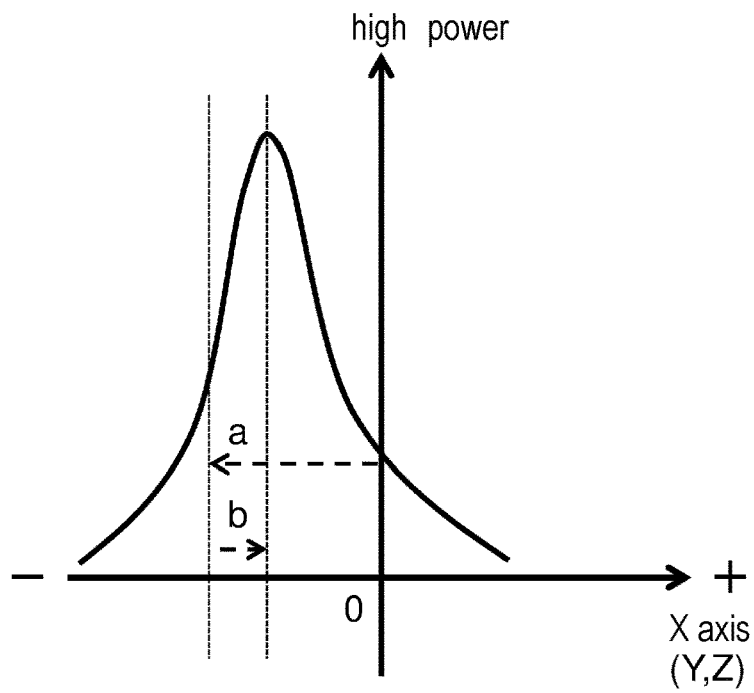
FIG. 7A shows an example of the procedure of adjusting the laser power.

As shown in FIG. 7A, if the power measured by power measurement unit 140 increases as condenser lens 210 is moved in the negative direction of the X axis, then condenser lens 210 is moved in the negative direction of the X axis until the power begins to decrease (route "a").

When condenser lens 210 is moved in the negative direction of the X axis until the power begins to decrease, condenser lens 210 is moved again in the positive direction of the X axis until reaching the position where the power is maximum (route "b").

Figure 7B:
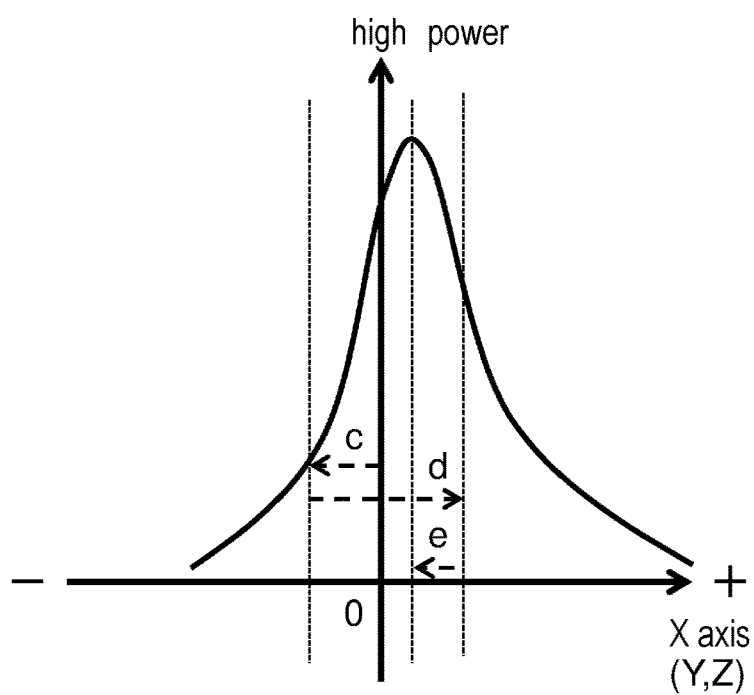
FIG. 7B shows another example of the procedure of adjusting the laser power.

Meanwhile, as shown in FIG. 7B, if the power measured by power measurement unit 140 decreases as condenser lens 210 is moved in the negative direction of the X axis (the end of route "c"), then condenser lens 210 is moved in the positive direction of the X axis.

The power is confirmed to increase as condenser lens 210 is moved in the positive direction of the X axis. Condenser lens 210 is moved in the positive direction of the X axis until the power begins to decrease (route "d"). When the power begins to decrease, condenser lens 210 is again moved in the negative direction of the X axis until reaching the position where the power is maximum (route "e").

Thus, condenser lens 210 is moved along the X axis to the position where the power is maximum. This operation may be repeated two or more times.

Lens adjustment mechanisms 230 and 240 move condenser lens 210 to the position where the power is maximum along each of the Y and Z axes in the same manner as along the X axis.

When the positioning of condenser lens 210 is completed, the position P1 of condenser lens 210 where the power is maximum along each of the X, Y and Z axes is either recorded on recording paper or stored in storage unit 434 of controller 430.

Referring back to the flowcharts of FIGS. 5 and 6, subsequent to Step S5, FFP measurement unit 130 measures the FFP of the laser beam (Step S6). Next, the BPP of the laser beam is calculated based on the FFP (Step S7). Lens adjustment mechanisms 220 to 240 of fiber joint 200 move condenser lens 210 based on the obtained BPP so as to perform alignment (Step S8).

Whether the BPP of the laser beam is minimized or not is monitored and determined by moving condenser lens 210 (Step S9). When a lens position P2 where the BPP is minimum is found, the lens position P2 is either recorded on recording paper or stored in storage unit 434 of controller 430 (Step S10).

The BPP is an index of the laser beam quality, which is generally expressed by Formula (1).

$$BPP = r \times \theta = M^2 = \lambda/\pi (mm \cdot mrad) \quad (1)$$

where r: the beam waist radius of the laser beam,

θ: the half width of the divergence angle of the laser beam, $M^2$: characteristic index representing the aperture limit of the laser beam, and λ: the oscillation wavelength of the laser beam.

In Step S7, the BPP can be derived from the FFP as follows.

First, the position coordinate where the light intensity has a peak value and the position coordinate where the light intensity is $1/e^2$ of the peak value are obtained from the FFP measured by FFP measurement unit 130. The distance between the two positions corresponds to the laser beam radius D.

FFP measurement unit 130 measures the FFP in the direction of travel of the laser beam at regular spacings so as to derive the beam radius D. The obtained beam radius D is plotted with respect to the direction of travel of the laser beam. In the present embodiment, the laser beam travels along the Z axis.

The plot can be fitted to a hyperbola so as to find the beam waist radius r of the laser beam.

When the laser beam is collected on FFP measurement unit 130, an fθ lens (not shown) can be used. In this case, the divergence angle distribution of the laser beam can be converted into a positional distribution on the light-receiving surface, thus facilitating the finding of the divergence angle θ of the laser beam.

The beam waist radius r and the divergence angle θ obtained as above can be substituted into the above-mentioned formula (1) to obtain the BPP.

The procedure in Step S10 is the same as that in Step S3 (FIGS. 7A and 7B) except for finding the position, of the condenser lens 210, where the BPP is minimum.

This operation may also be repeated two or more times.

Referring back to the flowcharts of FIGS. 5 and 6, laser beam 300 again strikes laser beam evaluation device 100. This time, attention is paid to both the power and quality of the laser beam.

First, lens adjustment mechanisms 220 to 240 move condenser lens 210 at predetermined spacings along a three-dimensional coordinate vector that points from the position P2 (Xb, Yb, Zb) of condenser lens 210 where the BPP is minimum toward the position P1 (Xp, Yp, Zp) of condenser lens 210 where the power is maximum (Step S11).

The predetermined spacings, which are different between the X, Y and Z axes, are in the range of several hundred nanometers to several micrometers. These values, however, can be changed appropriately according to the processing conditions, the desired laser beam shape and other conditions.

Laser beam evaluation device 100 measures the power of laser beam 304 (Step S12) and the FFP of laser beam 303 so as to find the BPP of laser beam 303 (Step S13).

It is determined whether condenser lens 210 has reached the position P1 (Step S14). If not, condenser lens 210 is moved by a predetermined spacing, and Steps S12 and S13 are performed again. If condenser lens 210 has reached the position P1, the process goes to Step S15.

Note that Step S12 is dispensable.

It is monitored and determined whether the BPP of laser beam 303 is not less than a predetermined value (Step S15). If the BPP is not less than the predetermined value, the position immediately before the position where the BPP has the predetermined value is determined, and the determined position is fixed as the final position of condenser lens 210 (Step S16). As a result, the position where the BPP is less than the predetermined value and which is closest to the position P1 is fixed as the final position.

If the BPP remains less than the predetermined value even after the condenser lens is moved from the position P2 to the position P1, the position P1 is fixed as the final position of condenser lens 210 (Step S17).

In Steps S16 and S17, the final position of condenser lens 210 may be stored in storage unit 434 of controller 430. In this case, the value can be used in the next alignment.

In the present embodiment, laser oscillator 400 is a solid-state YAG laser. Whether the process goes to Step S16 or Step S17 is determined by whether the BPP is not less than 0.373 (mm·mrad). This value, however, a mere example. For example, if laser oscillator 400 is a multi-wavelength laser formed of semiconductor lasers with different wavelengths, then the above determination is made by whether the BPP is not less than a predetermined value in the range of 2 to 10 (mm·mrad). The BPP value used as the criteria can be changed appropriately according, for example, to the oscillation wavelength of the laser, or the desired processing condition.

As described above, according to the present embodiment, laser beam 300 emitted from laser oscillator 400 through optical fiber 500 is divided into laser beams 304, 303 and 301. Laser beam 304 is led to power measurement unit 140, whereas laser beam 303 is led to FFP measurement unit 130. As a result, the power of laser beam 300 and the spatial intensity distribution corresponding to the laser beam shape can be monitored at the same time. With this configuration, alignment between laser oscillator 400 and optical fiber 500 can be achieved such that the power can be maximized with at least a certain level of beam quality while the power and quality of the laser beam are monitored at the same time.

In general, an increase in the output of the laser beam often causes changes in the intensity distribution. In the present embodiment, laser beam 301, which is not used for the measurement, is absorbed by damper 120, so that the laser beam can be measured under high output conditions used in actual processing. For example, the laser beam can be evaluated at kilowatt levels, and alignment can be performed based on the evaluation results.

Second Exemplary Embodiment

Figure 8:
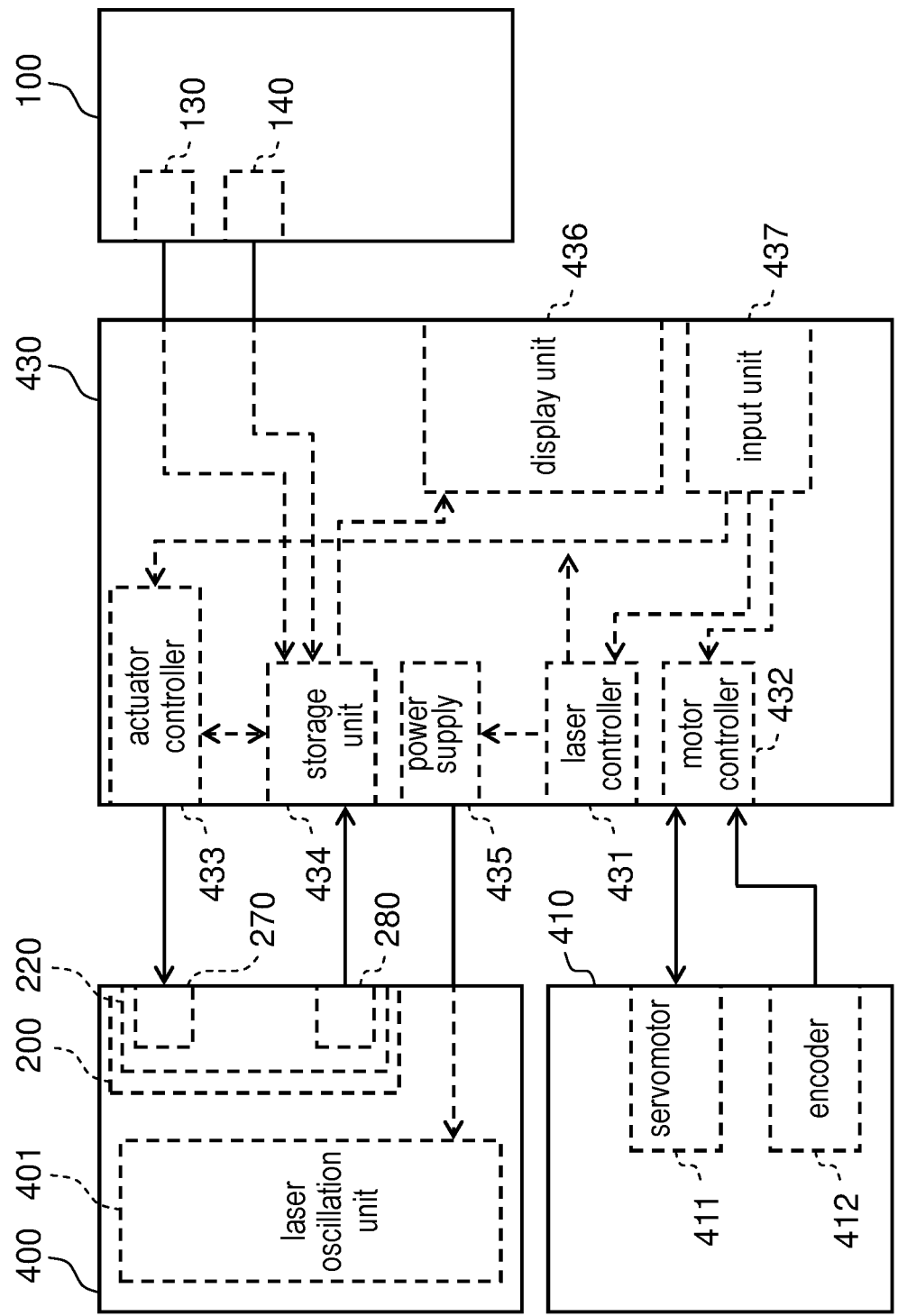
FIG. 8 is a functional block diagram of a laser processing device according to a second exemplary embodiment of the present invention.

FIG. 8 is a functional block diagram of a laser processing device according to a second exemplary embodiment of the present invention. The present embodiment greatly differs from the first exemplary embodiment in that lens adjustment mechanisms 220 to 240 include actuator 270 and displacement sensor 280.

Actuator 270, which is disposed on each of the X, Y and Z axes, moves condenser lens 210 based on the control signal from actuator controller 433 of controller 430.

Displacement sensor 280 detects the position of condenser lens 210 on the three-dimensional coordinate with a designed center position as the origin. The detected location information is transmitted as an electrical signal to storage unit 434 of controller 430, and is fed back to actuator controller 433.

Displacement sensor 280 may be disposed on each of the X, Y and Z axes. For simplification, FIG. 8 includes only one actuator 270 and only one displacement sensor 280. In fiber joint 200 shown in FIG. 8, aperture 260, condenser lens 210 and connector 250 are omitted.

Unlike controller 430 shown in FIG. 4, controller 430 shown in FIG. 8 has actuator controller 433.

Actuator controller 433 generates a control signal for adjusting the position of condenser lens 210 and transmits the control signal to actuators 270. The control signal is generated based on the information about the power and intensity distribution of the laser beam stored in storage unit 434, and the location information of condenser lens 210 transmitted from displacement sensor 280. Actuator controller 433 has the function of calculation unit 438 shown in FIG. 4. Actuator controller 433 can fetch the information about the intensity distribution of the laser beam from storage unit 434 and calculates the BPP of the laser beam.

Controller 430 in the present embodiment may alternatively include calculation unit 438 as an independent component, like in the first exemplary embodiment. FIG. 8 only illustrates the functional blocks used for the alignment, similar to FIG. 4.

When alignment is performed using the above configuration, the process of alignment shown in FIGS. 5 and 6 can be performed automatically by receiving the control program from input unit 437 and executing the program. For example, in Step S3, S8 and S11 of the flowcharts of FIGS. 5 and 6, condenser lens 210 is moved by actuator 270 disposed in each of lens adjustment mechanisms 220 to 240. In Steps S4, S9, S14 and S15, various kinds of determinations are performed either by actuator controller 433 or calculation unit 438. In Steps S5, S10, S16 and S17, the positions of condenser lens 210 in these cases are stored in storage unit 434.

In the present embodiment, the travel of condenser lens 210 during the alignment can be automatically performed using controller 430 of laser processing device 10. This eliminates the need for the alignment operator to work near the emission of the laser beam.

In particular, when alignment is performed with several kilowatts of output power close to the actual use conditions, the safety of the alignment operator should be ensured. The present embodiment can avoid problems that can occur during alignment.

Whether signals and commands are supplied to controllers 431 to 433 either directly from input unit 437 or after being stored in storage unit 434 is determined appropriately by the specification of laser processing device 10 or controller 430, and is not limited to the procedure described in the present embodiment. Similarly, the signal flow in controller 430 is not limited to that described in the present embodiment, either.

In the first and second exemplary embodiments, power measurement unit 140 is preferably a photoelectric sensor such as a photodiode. Photoelectric sensors have a rapid time response to the incident laser beam, so that the alignment takes less time. However, it is alternatively possible to use a thermal sensor such as an ordinary power meter although its time response is slower.

FFP measurement unit 130 is preferably a camera with a two-dimensional photosensor array such as a CCD or a CMOS image sensor. A two-dimensional photosensor array can obtain an accurate intensity distribution when it has a rapid time response to the incident laser beam and the array and pixel sizes are appropriate.

When both power measurement unit 140 and FFP measurement unit 130 are photoelectrical conversion devices, the power of the incident laser beam should be sufficiently narrowed in order to prevent damage or deterioration of the devices. Furthermore, the reflectance and transmittance of partial reflection mirrors 150 and 151 should be set carefully.

For example, the power of the laser beam incident on FFP measurement unit 130 is preferably reduced to the range of several microwatts to several hundreds of microwatts, when unit 130 is a CCD camera. The power of the laser beam incident on power measurement unit 140 is preferably reduced to the range of several milliwatts to several hundreds of milliwatts when unit 140 is a photodiode.

In the first and second exemplary embodiments, laser beam evaluation device 100 measures the laser beam emitted from laser emission head 420 so as to achieve the alignment between laser oscillator 400 and optical fiber 500. Alternatively, however, device 100 may directly measure the laser beam emitted from the emission end of optical fiber 500.

INDUSTRIAL APPLICABILITY

The alignment method according to the aspect of the present invention is useful because it ensures the laser beam power used for processing, while narrowing the laser beam and forming it into to a desired shape.

REFERENCE MARKS IN THE DRAWINGS 100 laser beam evaluation device
120 damper
130 FFP (beam quality) measurement unit
140 power measurement unit
150 partial reflection mirror
151 partial reflection mirror
200 fiber joint
210 condenser lens
220 to 240 lens adjustment mechanism (X, Y and Z axes)
270 actuator
280 displacement sensor
400 laser oscillator
410 manipulator
420 laser emission head
500 optical fiber

The invention claimed is:

1. A method for alignment between a laser oscillator and an optical fiber to be connected to the laser oscillator, the method comprising:

placing a condenser lens and a lens adjustment mechanism between a light emission part of the laser oscillator and an incident end of the optical fiber, the condenser lens being configured to collect a laser beam emitted from the laser oscillator and the lens adjustment mechanism being configured to adjust a position of the condenser lens, the method further comprising:

a measurement step of:
dividing the laser beam emitted from an emission end of the optical fiber into a plurality of laser beams including at least a first laser beam and a second laser beam, and
measuring a power of the first laser beam and a far field pattern (FFP) of the second laser beam;

a first adjustment step of:
adjusting the position of the condenser lens such that the measured power of the first laser beam is maximum, and
storing the position of the condenser lens as a first lens position;

a second adjustment step of:
calculating a beam parameter product (BPP) of the second laser beam from the FFP of the second laser beam measured in the measurement step,
adjusting the position of the condenser lens such that the BPP is minimum, and
storing the position of the condenser lens as a second lens position;

a third adjustment step of:
measuring an FFP of the second laser beam when the condenser lens is moved between the first lens position and the second lens position; and a fourth adjustment step of:
calculating a BPP of the second laser beam from the FFP of the second laser beam measured in the third adjustment step, and
adjusting the position of the condenser lens such that the BPP calculated from the FPP of the second laser beam measured in the third adjustment step is not more than a predetermined value.

2. The method according to claim 1, wherein in the fourth adjustment step,
when the BPP is not less than the predetermined value, fixing, as a final position of the condenser lens, a position immediately before a position where the BPP has the predetermined value, and
when the BPP is less than the predetermined value, fixing, as the final position of the condenser lens, the first lens position.

3. The method according to claim 1, wherein the lens adjustment mechanism includes following components:
a displacement sensor configured to detect the position of the condenser lens; and
an actuator configured to move the condenser lens, wherein
in the first adjustment step, driving the actuator to move the position of the condenser lens detected by the displacement sensor to the first lens position,
in the second adjustment step, driving the actuator to move the position of the condenser lens detected by the displacement sensor to the second lens position; and
in the fourth adjustment step, driving the actuator to move the position of the condenser lens detected by the displacement sensor to the position where the BPP is not more than the predetermined value.

4. The method according to claim 2, wherein the lens adjustment mechanism includes following components:
a displacement sensor configured to detect the position of the condenser lens; and
an actuator configured to move the condenser lens, wherein
in the first adjustment step, driving the actuator to move the position of the condenser lens detected by the displacement sensor to the first lens position,
in the second adjustment step, driving the actuator to move the position of the condenser lens detected by the displacement sensor to the second lens position; and
in the fourth adjustment step, driving the actuator to move the position of the condenser lens detected by the displacement sensor to the position where the BPP is not more than the predetermined value.

* * * * *